(12) United States Patent
Pflügl

(10) Patent No.: US 7,405,669 B2
(45) Date of Patent: Jul. 29, 2008

(54) SENSOR ARRANGEMENT

(75) Inventor: Thomas Pflügl, Neumark i.M. (AT)

(73) Assignee: E + E Elektronik Ges.m.b.H., Engerwitzdorf (AU)

( * ) Notice: Subject to any disclaimer, the term of this patent is extended or adjusted under 35 U.S.C. 154(b) by 225 days.

(21) Appl. No.: 11/334,335

(22) Filed: Jan. 18, 2006

(65) Prior Publication Data
US 2006/0176184 A1 Aug. 10, 2006

(30) Foreign Application Priority Data
Jan. 22, 2005 (DE) .................. 10 2005 003 046

(51) Int. Cl.
G08B 21/00 (2006.01)

(52) U.S. Cl. .............. 340/602; 340/500; 340/540; 340/601; 340/604; 73/29.01; 73/335.06

(58) Field of Classification Search ............. 340/602, 340/604, 539, 581, 584, 539.24, 539.26, 340/539.28, 540, 601, 603, 500; 374/4; 106/13; 73/29.01, 866.5, 170.17, 335.06, 335.08
See application file for complete search history.

(56) References Cited
U.S. PATENT DOCUMENTS
6,809,530 B2 10/2004 Schmitt et al.
7,028,531 B2 4/2006 Nikolaus
2003/0086475 A1 5/2003 Schmitt et al.
2003/0140681 A1 7/2003 Nikolaus FOREIGN PATENT DOCUMENTS
DE 103 14 018 A1 10/2004
DE 103 25 971 A1 12/2004
EP 1 306 242 A1 5/2003
JP 60076418 A 4/1985
WO WO 01/58731 A1 8/2001

OTHER PUBLICATIONS
Patent Abstracts of Japan publication regarding Japanese Publication 9-264900, published by Japanese Patent Office, 1998 and 2003, two pages.

Primary Examiner—Davetta W. Goins
Assistant Examiner—Sisay Yacob
(74) Attorney, Agent, or Firm—Brinks Hofer Gilson & Lione

(57) ABSTRACT

A sensor arrangement for detecting fogging on a glass pane, the arrangement including a support plate, a sensor element in thermal communication with the glass pane, wherein the sensor element is arranged on the support plate and is sensitive to moisture and a contact element that thermally couples the sensor element with the glass pane. The contact element is fastened on the support plate so as to enclose the support plate to a large extent in a contact area where the contact element contacts the glass pane.

19 Claims, 4 Drawing Sheets

SENSOR ARRANGEMENT

Applicant claims, under 35 U.S.C. § 119, the benefit of priority of the filing date of Jan. 22, 2005 of a German patent application, copy attached, Serial Number 10 2005 003 046.7, filed on the aforementioned date, the entire contents of which is incorporated herein by reference.

BACKGROUND OF THE INVENTION

1. Field of the Invention

The present invention relates to a sensor arrangement for detecting fogging on a glass pane, having a support plate on which at least one sensor element sensitive to moisture is arranged, wherein the sensor element is thermally connected with the glass pane. The sensor arrangement in accordance with the present invention is particularly suited for detecting fogging on a windshield of a motor vehicle.

2. Discussion of Related Art

Suitable sensor arrangements for detecting fogging on windshields of motor vehicles are known, for example, from WO 01/58731 or EP 1 306 242 A1. Arrangements are proposed in each one, which include a moisture-sensitive sensor element arranged on a support plate. A capacitive thin-film sensor is preferably provided as a suitable sensor element. The sensor element is thermally connected to the glass pane, and therefore to the temperature of the glass pane. Thermal coupling takes place by a thin adhesive foil. The sensor arrangement is furthermore fastened on the glass pane by the adhesive foil.

The thermal coupling of the sensor arrangement to the glass pane is important for the functioning of the arrangement. A contact area as large as possible between the sensor arrangement and the glass pane would be ideal for a good thermal coupling. However, this cannot be realized in many cases because of the amount of available structural space. Often only a small contact surface is available between the sensor arrangement and the glass pane, which is problematical with respect to good thermal coupling.

OBJECTS AND SUMMARY OF THE INVENTION

It is an object of the present invention to disclose a sensor arrangement for fogging detection on a glass pane, which assures good thermal coupling between the glass pane and the sensor element even under unfavorable installation conditions.

This object is attained by a sensor arrangement for detecting fogging on a glass pane, the arrangement including a support plate, a sensor element in thermal communication with the glass pane, wherein the sensor element is arranged on the support plate and is sensitive to moisture and a contact element that thermally couples the sensor element with the glass pane. The contact element is fastened on the support plate so as to enclose the support plate to a large extent in a contact area where the contact element contacts the glass pane.

In accordance with the present invention it has now been provided to suggest a contact element for the thermal coupling of the sensor element, which is fastened on the support plate by plugging and encloses the support plate in the contact area with the glass pane to a large extent. In this case the respective contact element is slipped on the support plate under mechanical tension in order to improve the thermal coupling.

It is now no longer necessary for the support plate to be in contact with the glass pane over a large surface and to be arranged parallel with respect to the glass pane for this purpose. Based on the intended contact element, an arrangement of the support plate with respect to the glass pane is possible, wherein the support plate is arranged oriented perpendicularly, for example, or at any desired angle with respect to the glass pane. This allows a space-saving embodiment of the entire sensor arrangement, wherein at the same time the heat coupling of the sensor element remains assured.

In a possible embodiment the contact element has a cutout in the area of the sensor element, which corresponds to the dimensions of the sensor element. Furthermore, the contact element used is advantageously made of a material with great heat-conducting capabilities, and it furthermore also has a certain amount of elasticity.

For example, a U-shaped metal spring or a T-shaped plastic sleeve is considered for being the contact element. In both cases the contact element can be slipped on the support plate.

Thus, in both cases a very good thermal coupling between the sensor element and the glass pane can be produced in spite of only a very small contact surface between the sensor arrangement and the glass pane. Only a little thermal resistance results between the sensor arrangement and the glass pane, and from that sufficient measurement accuracy in turn.

Because of the preferably elastic design of the contact element it is furthermore possible to compensate certain installation and attachment tolerances of the sensor arrangement, such as, for example, distance differences between the sensor element and the glass pane, or the required angular alignment between the sensor element and the glass pane.

Basically, the sensor arrangement in accordance with the present invention need have only one moisture-sensitive sensor element, by which the relative humidity near the glass pane is detected as a measurement for fogging up. In a slightly more elaborate variation it is possible to additionally provide a temperature-sensitive sensor element in order to furthermore perform a dewpoint measurement in this way. By this it is possible to draw conclusions regarding the climate in the passenger compartment via the temperature detected in the interior of the vehicle, in particular the relative humidity prevailing there. In both cases the steps in accordance with the present invention assure good thermal coupling to the glass pane of the sensor element(s) employed.

Furthermore, it is an advantageous step toward optimal thermal coupling if the distance between the sensor element and the glass pane is minimized as much as possible.

Further advantages, as well as details, of the sensor arrangement in accordance with the present invention ensue from the following description of exemplary embodiments by the attached drawings.

BRIEF DESCRIPTION OF THE DRAWINGS

FIG. 2b is a sectional view of a second embodiment of a sensor arrangement in accordance with the present invention, slightly modified with respect to the embodiment of FIG. 2a;

FIG. 3b is a sectional view of a fourth embodiment of a sensor arrangement in accordance with the present invention, slightly modified with respect to the embodiment of FIG. 3a; and FIG. 4 is a perspective view of an embodiment of a contact element in the exemplary embodiment in FIG. 3a.

DETAILED DESCRIPTION OF THE PREFERRED EMBODIMENTS

Figure 1:
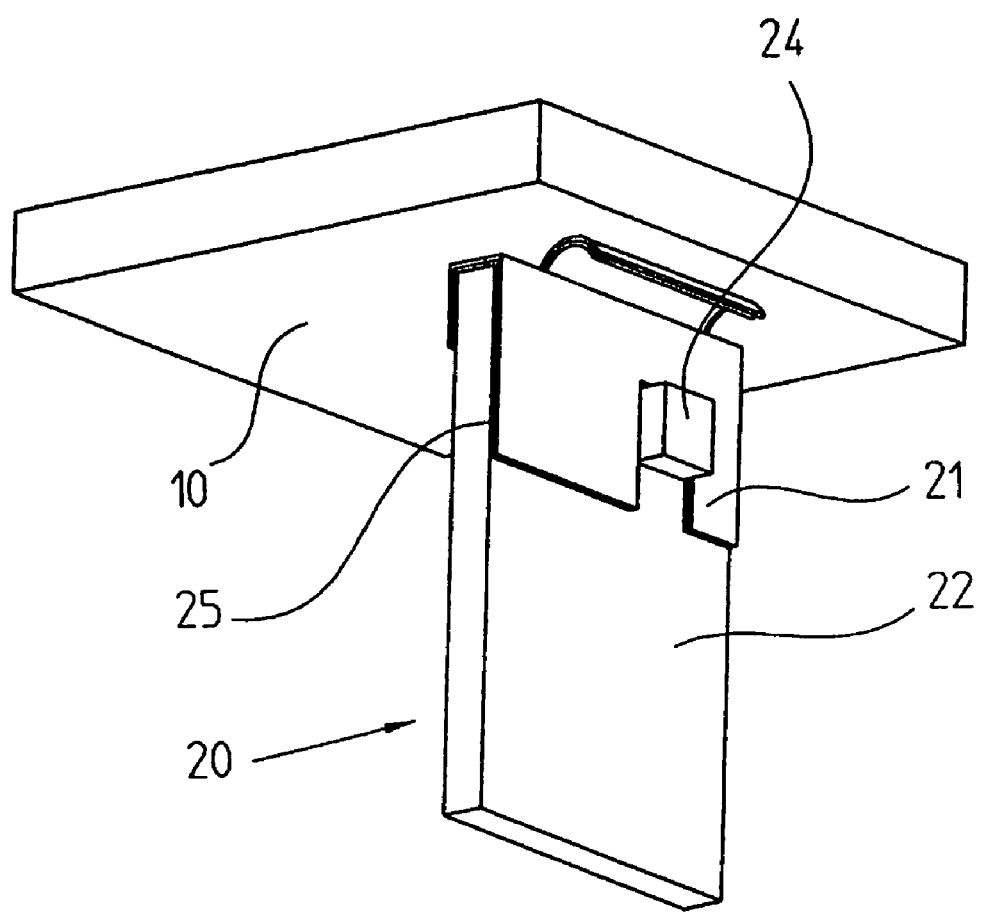
FIG. 1 is a perspective representation of a first embodiment of a sensor arrangement in accordance with the present invention together with a glass pane.
Figure 2A:
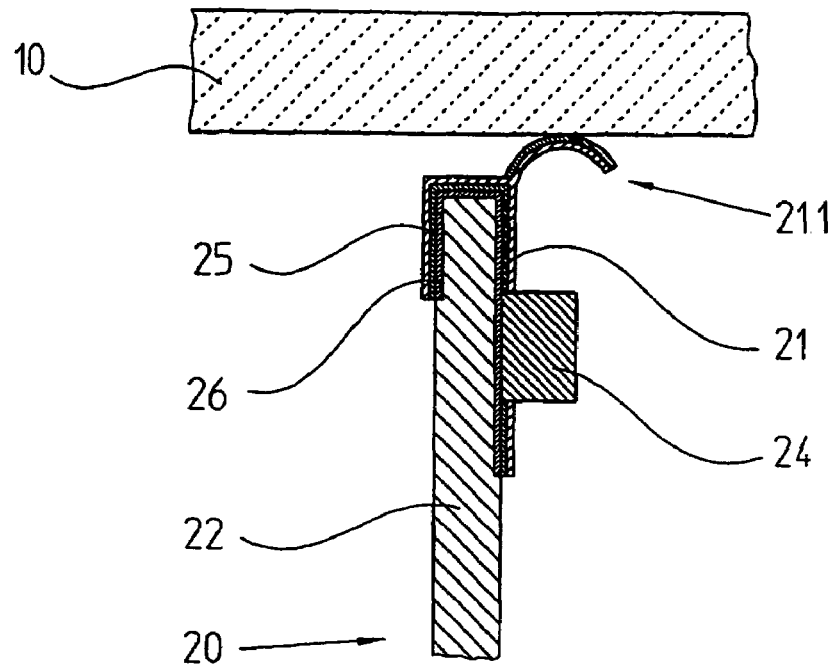
FIG. 2a is a sectional view of the sensor arrangement shown in FIG. 1.

A first embodiment of the sensor arrangement in accordance with the present invention, including a slightly modified variation thereof, will be described in what follows by FIGS. 1, 2a and 2b. While here FIG. 1 shows a perspective representation of the sensor arrangement 20 together with a portion of a glass pane 10, a sectional view of the sensor arrangement 20 from FIG. 1 is represented in FIG. 2a.

The glass pane 10 can represent, for example, the windshield of a motor vehicle, on whose inside the sensor arrangement 20 for fogging detection in accordance with the present invention is arranged. The start of a tendency of this glass pane 10 to fog up is detected by the sensor arrangement 20 and the corresponding signals are employed for taking suitable countermeasures by the heating and/or air conditioning installation.

The tendency of the glass pane 10 to fog up is detected by the sensor arrangement 20 in accordance with the present invention in the end. Depending on the embodiment, in this case either the relative humidity in the vicinity of the glass pane is detected, or a temperature measurement, as well as the calculation of the dewpoint, is additionally performed. While a moisture-sensitive sensor element is sufficient for the first variation, for the second variation a temperature-sensitive sensor element is additionally required. In this connection it is advantageous in both cases if the sensor arrangement 20 has the same temperature as the glass pane 10, if possible. Thus, as good as possible a thermal connection or thermal coupling of the sensor arrangement 20 and the associated sensor element(s), such as temperature and moisture sensor elements, for example, to the glass pane 10, is demanded. In the present example, the same as in the one following, only a moisture-sensitive sensor element is provided for detecting the tendency to fog up.

In the present example the thermal coupling of the sensor arrangement 20 to the glass pane 10 takes place via a contact element in the form of a metal spring 21, which has been slipped on the support plate 22 in the contact area with the glass pane 10. In principle, metals with good heat conductivity are considered as a suitable material for the metal spring 21, such as copper, aluminum or spring steel. The moisture-sensitive sensor element 24 has furthermore been indicated on the support plate 22. The moisture-sensitive sensor element 24 has been embodied in a known manner as a capacitive thin-film sensor. In case an additional temperature-sensitive sensor element is used, a known resistive element, such as a platinum resistor element, can be employed for this.

Strip conductors for the electrical contact with the sensor element 24 and for connecting it with other components are arranged on the support plate 22. The connecting lines for the sensor element 24 are represented in FIG. 2 and have been given the reference symbol 26. Other strip conductors and electronic components on the support plate 22 have not been represented in the drawings for reasons of improved clarity.

In the contact area with the glass pane 10, the contact element, or the metal spring 10 encloses the support plate 22 to a large extent. Only in the area of the sensor element 24 does the metal spring 21 have a cutout, which approximately corresponds to the dimensions of the sensor element 24 on the support plate 22. By the cutout it is assured that the sensor element 24 is in contact with the ambient air.

In the exemplary embodiment represented, a layer, which is capable of conducting heat and is insulating, in the form of a thin heat-conducting film 25 is moreover arranged on the inside of the metal spring 21 facing the support plate 22. A self-adhesive polyimide film of a thickness between 50 µm and 200 µm is preferably used as the heat-conducting film for example. Alternatively it is also possible to arrange a different glued-on or sprayed-on insulating layer at this location as the electrically insulating layer.

The heat-conducting film 25 is furthermore arranged on a contacting part 21.1 of the metal spring 21, which constitutes the contact area between the metal spring 21 and the glass pane 10. In this case the heat-conducting film 25 is arranged between the contacting part 21.1 and the glass pane 10. In this example, the contacting part 21.1 is embodied as an extension of the metal spring 21 at the U-end of the latter and extends along the support plate edge oriented in the direction toward the glass pane 10.

In the example represented, the heat flow between the glass pane 10 and the sensor element 24 runs from the glass pane 10 via the heat-conducting film 25 on the contacting part 21.1, the metal spring 21, the heat-conducting film 25, and the connecting lines 26 to the sensor element 24. In this case the metal spring 21 has the largest effect on the thermal coupling.

In the example represented, only the glass pane 10, as well as the support plate 22, are touched by the heat-conducting film 25. In the course of this it is assured on the part of the glass pane 10 that the glass pane 10 is not scratched by the metal spring 21. On the part of the support plate 22, an electrical short circuit between several strip conductors or connecting lines 26 of the sensor element 24 is prevented wherein, however, a good thermal coupling of all connecting lines 26 of the sensor element is simultaneously assured.

It has furthermore been shown to be advantageous that it is also possible to compensate pre-existing manufacturing tolerances by the provided elasticity of the contact element, or metal spring 21, for example distance differences between the sensor element and the glass pane, or the required angular alignment between the sensor element and the glass pane.

Figure 2B:
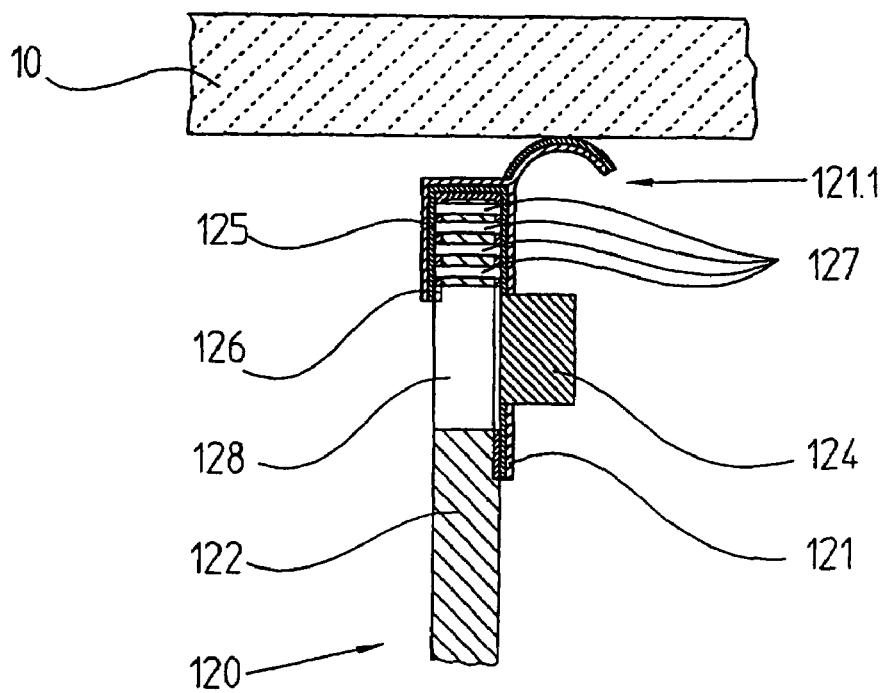

A variation of the first exemplary embodiment of the sensor arrangement in accordance with the present invention, which has been slightly modified with respect to the exemplary embodiment in FIG. 2a, is shown in a sectional view in FIG. 2b. In what follows, only the differences with the example of FIG. 2a will be addressed.

For one, it has been additionally provided to arrange bores 127 in a partial area of the support plate 122, which are provided with a coating capable of conducting heat, such as is also known, for example, from WO 01/58731 A1. In the present example the bores are only arranged in the partial area of the support plate 122 around which the metal spring 121 extends. The resulting total thermal resistance can be further reduced in this partial area by the bores 127 with the heat-conducting coating.

In connection with this variation it is furthermore provided to arrange the sensor element 124 above a cutout 128 of the support plate 122, such as was also proposed in WO 01/58731 A1. This mounting variation for the sensor element 124 has been shown to be advantageous in those cases, where the moisture-sensitive, or active, side of the sensor element 124 is oriented in the direction toward the support plate 122. In the example of FIG. 2a a mounting of the sensor element 24 is provided in which the moisture-sensitive side is oriented away from the support plate 22.

The explained first exemplary embodiment with a contact element embodied as a metal spring can of course also be further modified within the framework of the present invention. For example, a design of the metal spring could be mentioned in which the latter clasps the support plate laterally. Moreover, the contacting part 121.1 could also be embodied as being bent past the U-shaped part of the metal spring, etc.

Figure 3A:
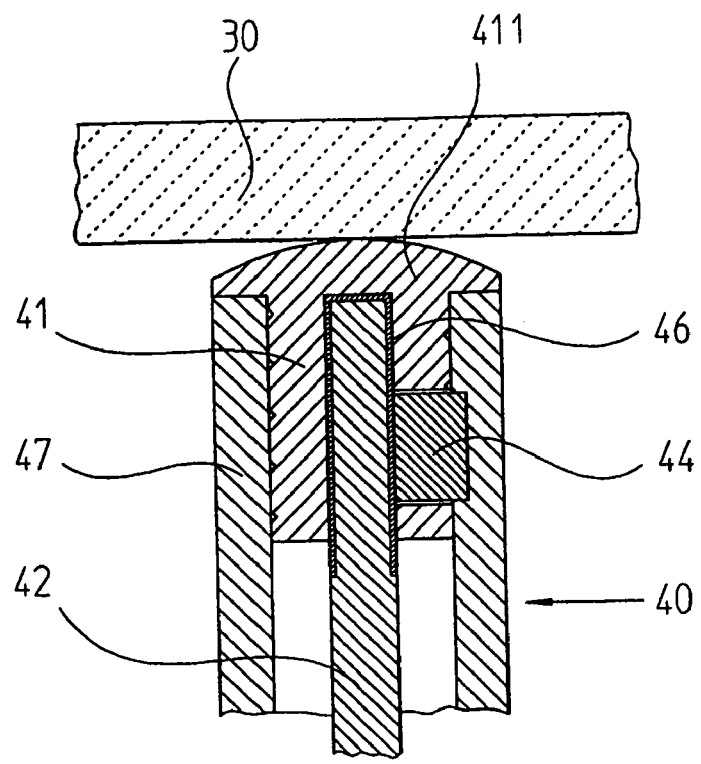
FIG. 3a is a sectional view of a third embodiment of a sensor arrangement in accordance with the present invention together with a glass pane.

A second exemplary embodiment of the sensor arrangement in accordance with the present invention will be described in what follows by means of FIGS. 3a, 3b and 4, including a slightly modified variation thereof. While FIG. 3a shows a sectional view of a second embodiment of the sensor arrangement in accordance with the invention together with a glass pane, the contact element used in this example is perspectively represented in FIG. 4. Again, the represented exemplary embodiment only includes a moisture-sensitive sensor element 44 and no temperature-sensitive sensor element. Of course, this variation could also be complemented by a further temperature-sensitive sensor element in order to perform a dewpoint measurement in this way, etc.

As can be seen in FIG. 3a, the sensor arrangement 40 in accordance with the present invention comprises in this exemplary embodiment again the support plate 42, on which the moisture-sensitive sensor element 44 is arranged and is brought into electrical contact by connecting lines 46. Now, in this exemplary embodiment a plastic sleeve 41 which can be slipped on is provided and is slipped on the support plate 42 with the sensor element 44 in the contact area between the glass pane 30 and the sensor arrangement 40. The plastic sleeve 41 has an approximately T-shaped cross section, wherein the contacting area 41.1 with the glass pane is constituted by the T-shaped cross support. The support plate 42 with the sensor element 44 is arranged in the longitudinal T-section, wherein the plastic sleeve has a cutout in the area opposite the sensor element. In this variation of the second embodiment the sensor element 44 is arranged on the support plate 42 in such a way that the moisture-sensitive side is oriented away from the support plate 42. The shape of the plastic sleeve 41 with the cutout provided for the sensor element 44 can be seen in the perspective representation in FIG. 4 in particular.

A housing 47 is furthermore slipped over the plastic sleeve 41 in the longitudinal T-element, so that a mechanically stable total structure results. It is furthermore achieved by this that the plastic sleeve 41 is pressed even more strongly against the metallic connecting lines 46 and a further reduction of the thermal resistance results in this way.

A thermally well conducting plastic material is selected as the material for the plastic sleeve 41, which is moreover laid out to be electrically conducting. A silicon material, filled with a heat-conducting ceramic material, for example, is considered for this.

For improving the thermal coupling between the glass pane 30 and the sensor element 40 it has furthermore been shown to be advantageous in connection with the exemplary embodiment to make the contacting part, i.e. the T-cross support with as large a surface as possible.

The plastic sleeve 41 is preferably slipped under a certain mechanical tension on the portion of the support plate 42 which faces the glass pane 30. Because of this the plastic sleeve 41 exerts a pressure on the connecting lines 46 of the sensor element 44 in this area. A low thermal resistance results at this location because of the intimate contact. To increase this effect it is furthermore advantageous to make the contact lines 46 of the sensor element 44 with the largest possible surfaces and to arrange them in the direction toward the glass pane 30. Moreover, the front face of the support plate can also be metallized for an again improved thermal coupling.

In the end, the plastic sleeve is pressed against the thermally well conducting connecting lines 46 by means of the housing 47 and the glass pane 30, because of which the thermal resistance at this location becomes very low.

Because of the elasticity of the plastic sleeve 42 it is again possible to compensate pre-existing installation tolerances in connection with the sensor arrangement in accordance with the present invention. In this case the impression depth of the elastic material is laid out in such a way that different installation depths of the sensor arrangement can be compensated and the thermal contact with the glass pane is always assured.

Figure 3B:
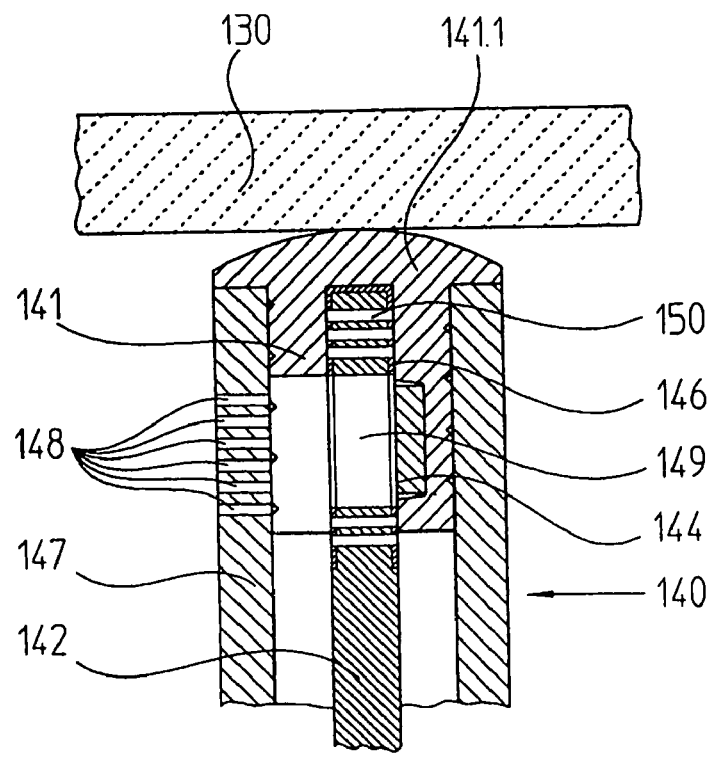
Figure 4:
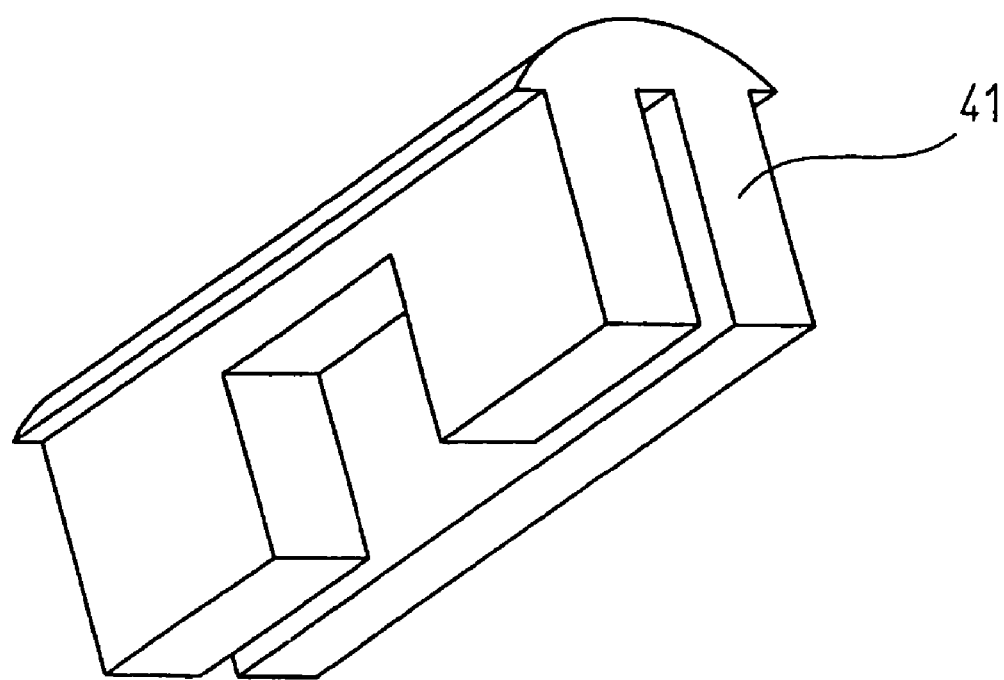

An again only slightly modified variation of the second embodiment is represented in FIG. 3b together with glass pane 130 in a sectional view. In what follows, only the differences with the example in FIG. 3a will be explained. Thus, analogously to the example in FIG. 2a, bores 150 have been arranged in partial areas of the support plate 142, which are provided with a coating capable of conducting heat. The sensor element 144 is furthermore arranged above a cutout 148 of the support plate 142. In this variation the moisture-sensitive side of the sensor element 144 is oriented in the direction toward the cutout 149. To assure that with this mounting type the moisture-sensitive side of the sensor element 144 also comes into contact with the ambient air, the housing 147 furthermore has slits 148 in the area of the cutout, through which an appropriate air circulation can take place. In this variation the plastic sleeve 141 with a contacting part 141.1 used furthermore does not have a cutout for the sensor element 144, but instead is slipped completely over the sensor element 144. This is possible in the instant case because the active, or moisture-sensitive side of the sensor element 144 is oriented in the direction toward the support plate 142.

The second exemplary embodiment with a contact element embodied as a plastic sleeve can also be further modified within the framework of the present invention. Thus it would be possible, for example, to design the longitudinal element of the plastic sleeve without slits and to press it against only one side of the support element by means of the housing. Moreover, within the framework of the present invention there are obviously still further embodiment possibilities for the sensor arrangement.

The foregoing description is provided to illustrate the invention, and is not to be construed as a limitation. Numerous additions, substitutions and other changes can be made to the invention without departing from its scope as set forth in the appended claims.

I claim:

1. A sensor arrangement for detecting fogging on a glass pane, comprising:
    a support plate;
    a sensor element in thermal communication with said glass pane, wherein said sensor element is arranged on said support plate and is sensitive to moisture; and
    a contact element that thermally couples said sensor element with said glass pane, wherein said contact element is fastened on said support plate so as to enclose said support plate to a large extent in a contact area where said contact element contacts said glass pane, wherein said contact element is elastic and can be slipped on said support plate under mechanical tension.

2. The sensor arrangement in accordance with claim 1, wherein said contact element defines a cutout that is positioned in an area of said sensor element and which has dimensions that approximately correspond to dimensions of said sensor element.

3. The sensor arrangement in accordance with claim 1, wherein said contact element comprises a material with high heat-conducting capabilities.

4. The sensor arrangement in accordance with claim 1, wherein said contact element comprises a metal spring.

5. The sensor arrangement in accordance with claim 4, further comprising an electrically insulating layer, which is capable of conducting heat, that is arranged in said contact area between said metal spring and said support plate.

6. The sensor arrangement in accordance with claim 4, further comprising an electrically insulating layer, which is capable of conducting heat, that is arranged in said contact area between said metal spring and said glass pane.

7. The sensor arrangement in accordance with claim 5, wherein said electrically insulating layer comprises a self-adhesive polyimide layer.

8. The sensor arrangement in accordance with claim 6, wherein said electrically insulating layer comprises a self-adhesive polyimide layer.

9. The sensor arrangement in accordance with claim 4, wherein said metal spring is made from a material selected from the group consisting of copper, aluminum and spring steel.

10. The sensor arrangement in accordance with claim 1, wherein said contact element comprises a plastic sleeve which can be slipped on said support plate.

11. The sensor arrangement in accordance with claim 10, wherein said plastic sleeve comprises a T-shaped cross section that defines a cross support and a longitudinal section attached thereto, wherein said cross support is provided for contact with said glass pane, and said support plate with said sensor element is arranged in said longitudinal section of said plastic sleeve.

12. The sensor arrangement in accordance with claim 10, wherein said plastic sleeve comprises a silicon material filled with a heat-conducting ceramic material.

13. The sensor arrangement in accordance with claim 10, wherein connecting lines of said sensor element are arranged in a direction toward said glass pane.

14. The sensor arrangement in accordance with claim 13, wherein said connecting lines of said sensor element are designed with large surfaces.

15. The sensor arrangement in accordance with claim 1, further comprising a temperature-sensitive element arranged on said support plate.

16. The sensor arrangement in accordance with claim 1, wherein at least in an area of said contact element said support plate comprises bores which are provided with a layer capable of conducting heat.

17. The sensor arrangement in accordance with claim 1, wherein said sensor element is mounted above a cutout of said support plate, wherein a moisture-sensitive side of said sensor element is oriented in a direction toward said cutout.

18. A sensor arrangement for detecting fogging on a glass pane, comprising:
    a support plate;
    a sensor element in thermal communication with said glass pane, wherein said sensor element is arranged on said support plate and is sensitive to moisture; and
    a contact element that thermally couples said sensor element with said glass pane, wherein said contact element is fastened on said support plate so as to enclose said support plate to a large extent in a contact area where said contact element contacts said glass pane, wherein said contact element comprises a metal spring.

19. A sensor arrangement for detecting fogging on a glass pane, comprising:
    a support plate;
    a sensor element in thermal communication with said glass pane, wherein said sensor element is arranged on said support plate and is sensitive to moisture; and
    a contact element that thermally couples said sensor element with said glass pane, wherein said contact element is fastened on said support plate so as to enclose said support plate to a large extent in a contact area where said contact element contacts said glass pane, wherein said contact element comprises a plastic sleeve which can be slipped on said support plate.

* * * * *